(12) United States Patent
Danninger (10) Patent No.: US 7,802,203 B2
(45) Date of Patent: Sep. 21, 2010

(54) METHOD FOR PROVIDING SELECTABLE ALTERNATE MENU VIEWS

(75) Inventor: Michael Danninger, Landau (DE)

(73) Assignee: SAP AG, Walldorf (DE)

(*) Notice: Subject to any disclaimer, the term of this patent is extended or adjusted under 35 U.S.C. 154(b) by 298 days.

(21) Appl. No.: 11/317,313

(22) Filed: Dec. 23, 2005

(65) Prior Publication Data

US 2007/0150839 A1 Jun. 28, 2007

(51) Int. Cl.
*G06F 3/048* (2006.01)
*G06F 3/00* (2006.01)

(52) U.S. Cl. .............. 715/841; 715/713; 715/793; 715/810; 715/828; 715/829

(58) Field of Classification Search ............ 715/841, 715/713, 793, 810, 828, 829
See application file for complete search history.

(56) References Cited

U.S. PATENT DOCUMENTS

| | | | | |
|---|---|---|---|---|
| 5,565,888 | A * | 10/1996 | Selker | 715/823 |
| 6,208,324 | B1 * | 3/2001 | Sundstrom et al. | 715/846 |
| 7,036,090 | B1 * | 4/2006 | Nguyen | 715/834 |
| 7,036,091 | B1 * | 4/2006 | Nguyen | 715/834 |
| 2003/0202019 | A1 | 10/2003 | Detweiler et al. | |
| 2005/0076312 | A1 | 4/2005 | Gardner et al. | |
| 2005/0149873 | A1 | 7/2005 | Guido et al. | |
| 2009/0034931 | A1 * | 2/2009 | Stone et al. | 386/52 |

FOREIGN PATENT DOCUMENTS

EP 0317480 A2 5/1989
JP 03083121 A 4/1991

OTHER PUBLICATIONS

"Sun Management Center 3.0 Software Help,"; http://docs.sun.com/source/806=5942/details; Copyright Date: 2000.*
Annoyances.org, "Learn to Explore with Folders: Windows XP, 2000, Me, 98, and 95." Copyright Date:Dec. 30, 2004.*
Windows XP. "Help and Support Center—Mouse Buttons." Copyright 2001.*
"HGrid: Hierarchy Grid or Tree Table"; Copyright Jun. 2, 2004; http://www.oracle.com/technology/tech/blaf/specs/hgrid.html?_template=/ocom/print.*
NPL Reference W; "Snapshot of Windows XP: Assigning Mouse Functions". Copyright 2001.*

(Continued)

*Primary Examiner*—Doug Hutton
*Assistant Examiner*—Soumya Dasgupta
(74) *Attorney, Agent, or Firm*—Kenyon & Kenyon LLP (57) ABSTRACT

In a method for providing a menu display, in response to a menu item selection, the method may determine whether a menu map selection event or a cascading menu selection has occurred, may display a plurality of menus including those that are of a hierarchical level below and not immediately following the hierarchical level of the menu item upon a condition that the menu map selection event occurred, and may display a plurality of menus including a submenu of the menu item that is of an hierarchical level immediately below and not further below that of the menu item if the cascading menu selection has occurred.

24 Claims, 4 Drawing Sheets

OTHER PUBLICATIONS

Kobayashi et al."Considering the Direction of Cursor Movement for Efficient Traversal of Cascading Menus". Copyright 2003.*

Ahlstrom et al."Improving Menu Interaction: a Comparison of Standard Force Enhanced and Jumping Menus". Copyright 2006.*

Cockburn et al."Faster Cascading Menu Selections with Enlarged Activation Areas". Copyright 2006.*

Ahlstrom, David."Modeling and Improving Selecting in Cascading Pull-Down Menus Using Fitts' Law, the Steering Law, and Force Field". Copyright 2005.*

International Business Machines Corporation: "User interface control to customize the expansion of a tree view" Research Disclosure, Mason Publications, Hampshire, GB, vol. 450, No. 146, Oct. 2001, XP007129168 ISSN: 0374-4353.

* cited by examiner

METHOD FOR PROVIDING SELECTABLE ALTERNATE MENU VIEWS

BACKGROUND

Computer applications include a large number of operations. An operation is utilized by user input instructing a processor to execute instructions for performance of the operation. Such user input is often provided via a graphical user interface in which is displayed menus including selectable menu items. Selection by a user of a menu item is interpreted by the processor as an instruction to perform an operation to which the selected menu item corresponds.

Figure 1:
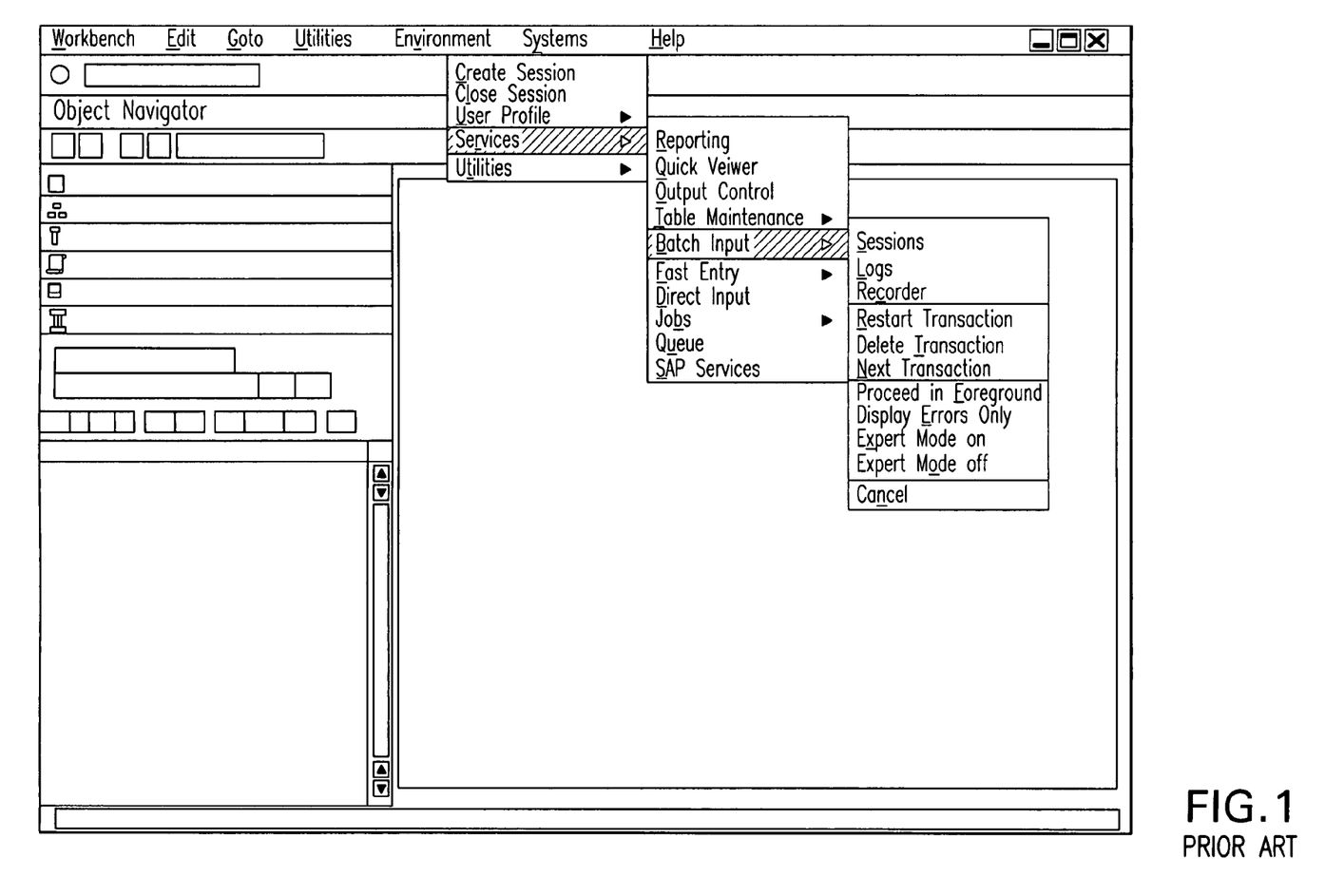
FIG. 1 is a screenshot of a conventional display of hierarchical cascading menus.

It is conventional to provide selectable operations of an application in multiple menus according to defined categories. For one or more of the menus, further cascading menus are provided in an hierarchical manner, as shown in FIG. 1. Often only the menu categories, without the corresponding menus, are initially displayed. Then in response to selection of a displayed category, the corresponding cascading menu is displayed. Often, a menu includes 3 or more cascading levels in its hierarchy.

Conventionally, a cascading menu remains displayed only as long as its parent menu item remains selected. While a first menu item of a menu of a particular hierarchical level is selected, selection within the menu of another menu item causes deselection of the previously selected menu item. When a parent menu item of a cascading menu is deselected, the cascading menu is removed from display.

Because of the fleeting nature of the display of cascading menus, searching for particular menu items is often a time consuming trial and error experience, especially for occasional users who are unfamiliar with the available menu items and/or their positions within the menu hierarchy. Further, even for those who are familiar with the available menu items and their positions within the menu hierarchy, selection of a menu item is often difficult because inadvertent movement of a mouse cursor from a selected parent menu item to another menu item causes removal from display of the desired cascading menu.

DETAILED DESCRIPTION

Embodiments of the present invention relate to a computer system and method that may provide for selectable alternate views of hierarchically arranged menus. In a first of the selectable views, in response to selection of a menu item, a child submenu of the selected menu item that corresponds to a hierarchical level immediately below that of the selected parent menu item may be displayed without display of submenus that correspond to lower hierarchical levels. In a second of the selectable views, in response to selection of the menu item, all child submenus of the selected menu item that correspond to hierarchical levels below that of the selected parent menu item may be concurrently displayed in a menu map. The computer system may include a computer program written in any conventional computer language, and in particular in an object oriented computer language. Example computer languages that may be used to implement the computer system and method of the present invention may be Java, Extensible Markup Language (XML), C++, or a combination thereof. The computer program may include instructions that are executable by a processor and that are stored on a hardware computer-readable medium. The computer program may include event detection methods for detecting and responding to a view selection event to provide the menus and submenus according to the event's corresponding view.

Figure 2:
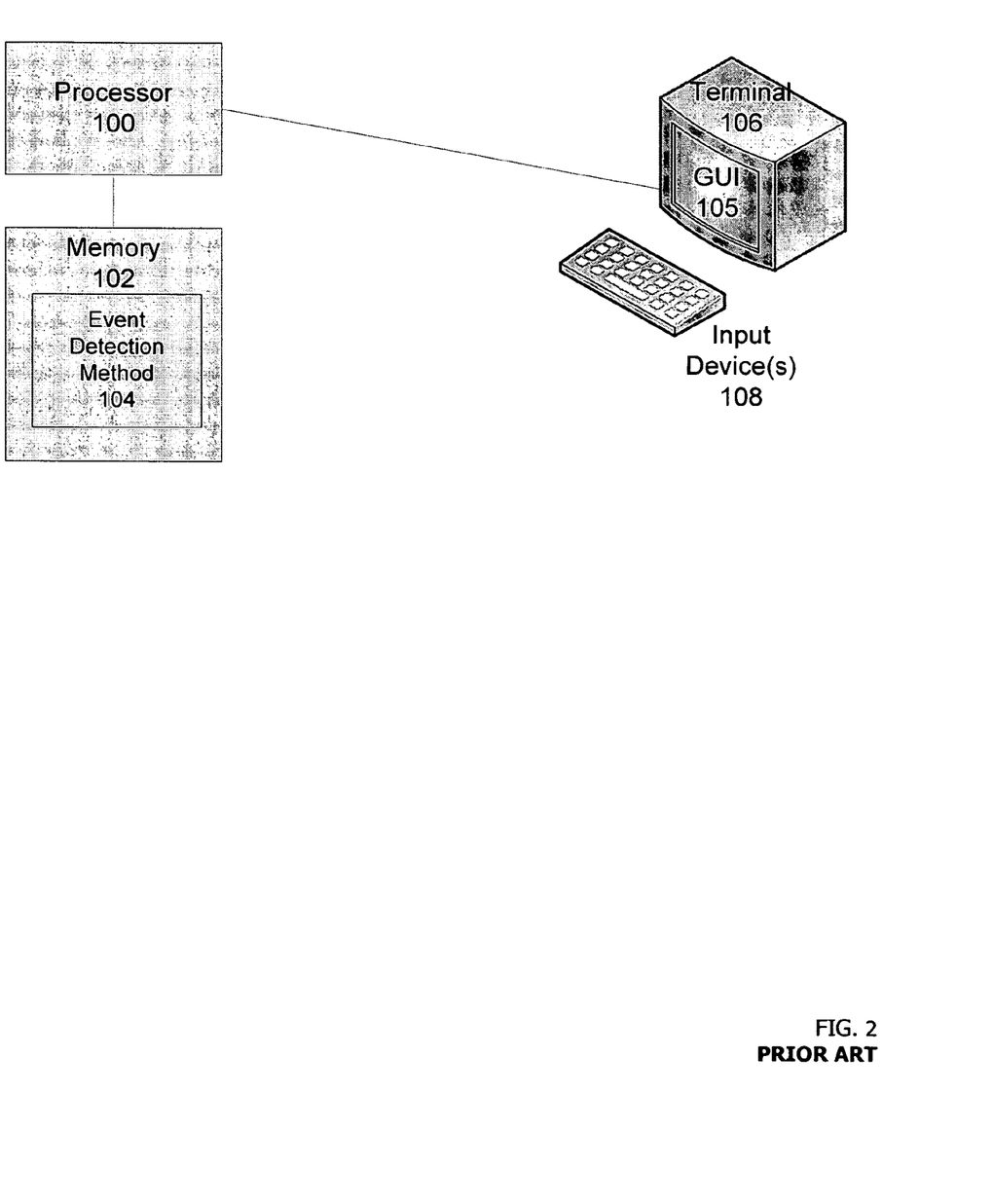
FIG. 2 is a block diagram that illustrates example components of a system according to an example embodiment of the present invention.

FIG. 2 is a block diagram that illustrates example components of a system on which embodiments of the present invention may be implemented. A processor 100 may execute the program instructions. For example, in a memory 102, which may be the hardware computer-readable medium, may be stored an event detection method 104 for detection of an event that is interpreted as an instruction to provide a menu. The instruction to provide the menu may be input in different ways corresponding to different menu view selections. The event detection method 104 may detect the way in which the instruction is provided and may accordingly determine the selected menu view. At a terminal 106 that includes a graphical user interface (GUI) 105 may be provided an input device 108 for inputting the menu view selection. The input device may be a keyboard, a mouse, or any other conventional input device. In response to input via the input device 108 for a menu view selection, the event detection method 104 may determine the selected menu view and cause the processor 100 to output data for generation of a display that is in accordance with the selected view and that may be provided at the GUI 105.

In an embodiment of the present invention, a display may be provided at the GUI 105 that includes a listing of one or more menu categories. (A menu category, as referred to herein, is an item that is of a highest hierarchical level with respect to menu display of an application or portal. A menu listing, as referred to herein, is a listing of a menu other than a menu category. A menu item, as referred to herein, is that which is either a menu category or a menu listing. A menu, as referred to herein, is a list that includes menu listings of a same hierarchical level. Accordingly, while a menu category is of a highest hierarchical level with respect to menus, it is not of a highest hierarchical menu level, since, as referred to herein, a menu category is not of a menu.) For example, the listing of menu categories may be provided in a menu bar of an application workspace or portal home page display window as shown in FIG. 1. In response to an input via the input device 108 for requesting a menu, the event detection method 104 may determine whether a cascading menu view or a menu map view is selected. In one embodiment of the present invention, the cascading menu view selection may be detected when a mouse pointer is moved over or in close proximity to a menu category, and the menu map view selection may be detected when a mouse-click is detected. Alternatively, a left-mouse-click may be associated with the cascading menu view selection, and a right-mouse-click may be associated with the menu map view selection. It will be appreciated that these are non-exclusive examples of associations of events to menu view selections, and that other events may be instead or additionally correspondingly associated with the menu view selections. For example, the other events may also be via a mouse or may be via a different input device 108, such as keyboard keystrokes.

If it is determined in response to selection of a menu category that the cascading menu view is selected, the event detection method 104 may cause the system to display in response to the menu request, only a menu of a highest hierarchical menu level. For example, in response to selection of "System" in FIG. 1, the left-most menu beneath "System" may be displayed and the menus shown to the right may be omitted from display.

A menu may include items that represent a selectable feature, in response to selection of which a desired application operation may be performed, and may include items that represent headings of submenus, in response to selection of which a cascading menu of items that are of a lower hierarchical level may be displayed. For example, in FIG. 1, "Close session" is indicated to be a selectable program feature, while "Services" is indicated to be a submenu heading by virtue of an arrow placed by the "Services" menu item.

In one example embodiment, the event detection method 104 may determine which menu view is selected in response to a menu category selection, but may refrain from making this determination in response to selection of a menu item of menus provided in response to the initial menu and view selection, i.e., a menu listing. According to this embodiment, after the menu of the highest hierarchical menu level is provided, in response to selection of a menu listing within the menu or within lower level menus, the system may provide a cascading submenu regardless of the way the menu item selection is input. Example cascading menu are shown in FIG. 1. The center menu of FIG. 1 is a cascading menu provided in response to selection of the "Services" menu heading displayed in the left most menu of FIG. 1, and the right most menu of FIG. 1 is a cascading menu provided in response to selection of the "Batch Input" menu heading displayed in the center menu of FIG. 1.

In an alternative example embodiment, in response to selection of a menu listing, if the selected menu listing is a submenu heading, the event detection method 104 may determine a selected view for display of the submenu, regardless of the hierarchical level of the menu including the selected menu listing. If the event detection method 104 determines that the cascading menu view is selected, the event detection method 104 may cause the system to display the selected submenu as a cascading menu.

In an example embodiment of the present invention, a menu provided in response to a cascading menu view selection may be displayed within the main program window, e.g., the application workspace or portal home page window. If a particular menu listing or menu category in response to selection of which the menu is displayed is deselected, the menu provided in response to its initial selection may be removed from the display window. For example, movement of the mouse pointer to a different menu category or to a different menu listing that is in a menu that includes the particular menu listing or that is in a parent menu of the particular menu listing may deselect the initially selected menu category or particular menu listing. Alternatively or additionally, movement of the pointer to an area outside of any of the displayed menus may deselect all previously selected menu items. Consider the above as applied to the menus shown in FIG. 1. If the mouse pointer is moved to or clicked at an area of the "User Profile" menu heading, the "Services" menu heading may be deselected and the center and right-most menus of FIG. 1 may be removed from display.

Figure 3:
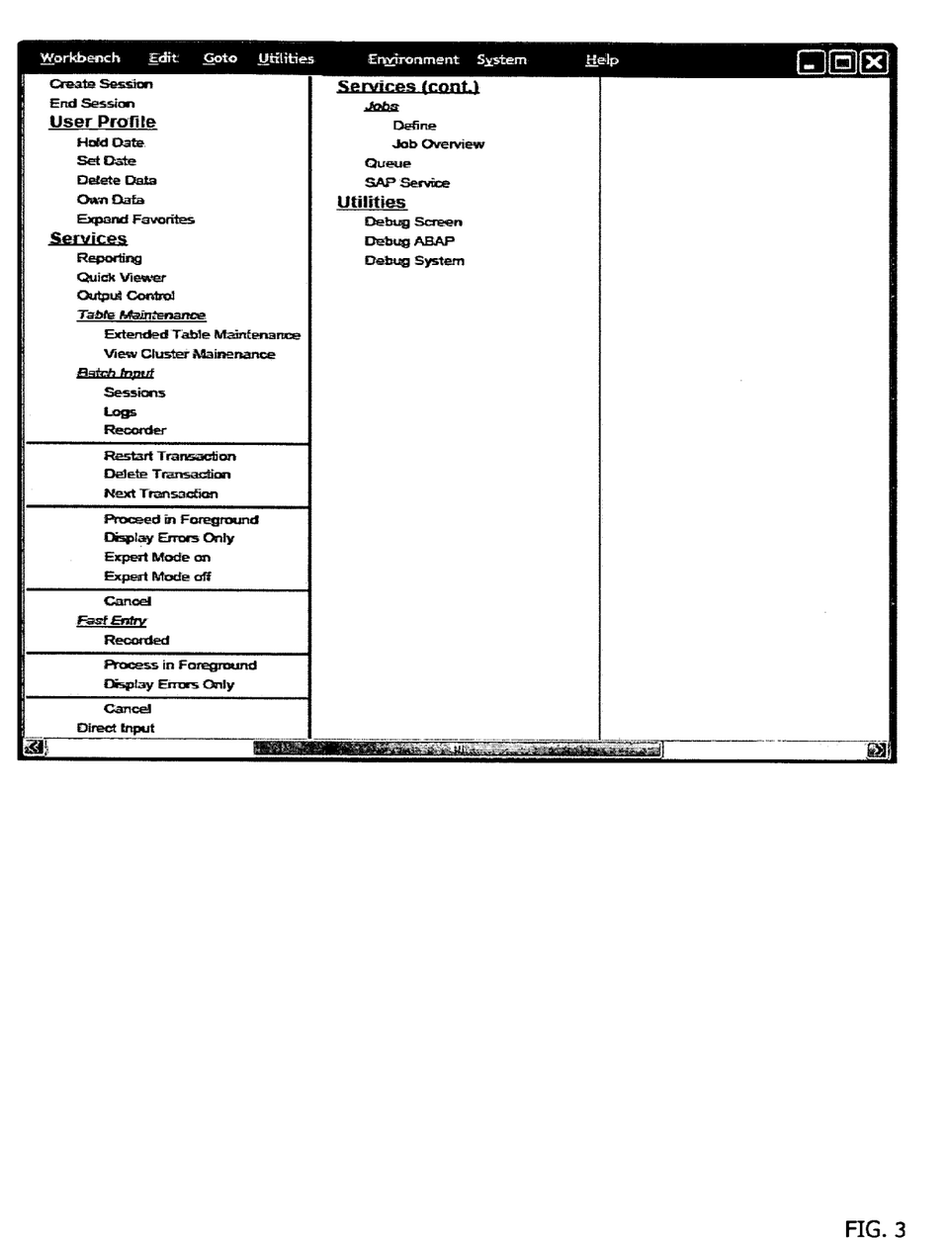
FIG. 3 is a screenshot of a menu display according to an example embodiment of the present invention.

In an example embodiment of the present invention, if when the event detection method 104 determines a selected menu view in response to selection of a menu category it is determined that the menu map view is selected, the event detection method 104 may cause the system to display all menus and submenus of the menu category so that they may be displayed simultaneously. For example, the menus and submenus may be displayed in a separate display window as shown in FIG. 3. FIG. 3 shows a listing of all menu items of the "System" menu category displayed in index form, where a hierarchical level of a menu listing may be indicated by an extent of its indentation. For example, the first three menu items listed in the menu of FIG. 3 are indented by the least amount, while the next five entries are indented by a greater amount, indicating that the five entries are of a submenu of the third menu item, "User Profile." With respect to the menu map, all menu items that are of the same hierarchical level and that are of a same menu heading, or, if they are at the highest hierarchical menu level, of the same menu category, are referred to herein as being parts of a same menu. If menu listings are of different hierarchical levels, or if they are of the same hierarchical level but are of different menu categories or different menu headings, they are referred to herein as being parts of different menus.

As discussed above, in an embodiment of the present invention, the event detection method 104 may determine the selected view for display of a submenu regardless of the hierarchical level of the menu including the selected menu listing. According to this embodiment, if the event detection method 104 determines, in response to a selection of a menu listing of a menu provided in response to a previous selection, that the menu map view is currently selected, the system may provide a menu map as shown in FIG. 3, including all menus and submenus that are of the menu category to which the selected menu listing belongs, regardless of the hierarchical level of the menu to which the selected menu listing belongs, and regardless of a menu view selection according to which the menu including the currently selected menu listing was displayed. Alternatively, if the previously displayed menu is displayed according to the cascading menu view selection, the system may provide a menu map that includes only those menu listings of the menu that includes the selected menu listing, of the menu(s) that is a parent menus(s) of the menu that includes the selected menu listing, and of all submenus of the selected menu listing.

In one example embodiment of the present invention, determination of a menu view selection in response to selection of a menu listing of a previously displayed menu may be restricted to selection of a menu listing of a menu displayed according to the cascading menu view selection. Alternatively, the determination may be also made in response to selection of a menu item of a menu map. If it is determined that the cascading menu view is selected, the system may close the previously displayed menu map and display the selected submenu and all its parent menus according to the cascading view.

In an embodiment of the present invention, as is the case with respect to menus displayed in accordance with the cascading menu view, menus displayed in accordance with the menu map view may include a menu listing that represents a selectable feature, in response to selection of which a desired application operation may be performed.

The system may configure the displayed menu window so that it does not exceed a predetermined length and/or so that its vertical scrolling area does not exceed a predetermined amount. For example, if the number of menu items exceed a number of items that may be provided in a vertical listing within the allotted vertical scrolling area, the system may divide the window into a plurality of columns, so that when the bottom of the scrolling area of a first column is reached, the menu listing is continued at the top of a next column, as shown in FIG. 3.

In an example embodiment of the present invention, the window including the menu map may include a menu bar as shown in FIG. 3 that lists the menu categories listed in an application workspace window to which the menu map corresponds. According to this embodiment, if the event detection method 104 detects that a menu category of the menu map menu bar is selected that is different than the menu category of the menu listings displayed in the menu map, the system may modify the menu map to include menu listings of the different menu category instead of or in addition to the previously displayed menu listings, i.e., the menu listings of the previously selected menu category.

In an embodiment of the present invention, menus displayed in response to a menu map view selection may be removed according to different criteria that that according to which menus initially displayed in response to a cascading view selection are removed from display. For example, while the latter menus may be removed from display in response to movement of a mouse pointer to or click of a mouse pointer at a display area of another menu category or menu listing, or to an area outside of any of the displayed menus, the former menus may remain displayed even when these events occur. Instead, according to this example embodiment, the menu map window may remain displayed until it is closed by selecting a window exit button or key, such as the escape key. In an alternative embodiment, the menu map window may also be removed from display when the mouse pointer is moved to or clicked at an area external to the menu map window, similar to the removal from display of the menus displayed in accordance with the cascading menu view.

In one example embodiment of the present invention, selection of a menu heading in the menu map may be ignored. In an alternative embodiment, in response to selection of a particular menu heading in the menu map, menu listings of a same hierarchical menu level as that of the particular menu heading but of a different menu, and their submenus, may be removed from display. Additionally, menu listings that are of a higher hierarchical menu level than that of the particular menu heading and are not of menus that include parent menu listings of the particular menu heading may be removed from display.

In an example embodiment of the present invention, in response to a menu map selection input made while a mouse pointer is within an area of a menu bar that is not associated with any particular one of the listed menu categories, the system may provide a menu map that includes the menu listings of all of the menu categories. In a slight variation of this embodiment, a particular area of the menu bar may be designated for this purpose. For example, an all-category icon may be displayed in the menu bar for this purpose.

Figure 4:
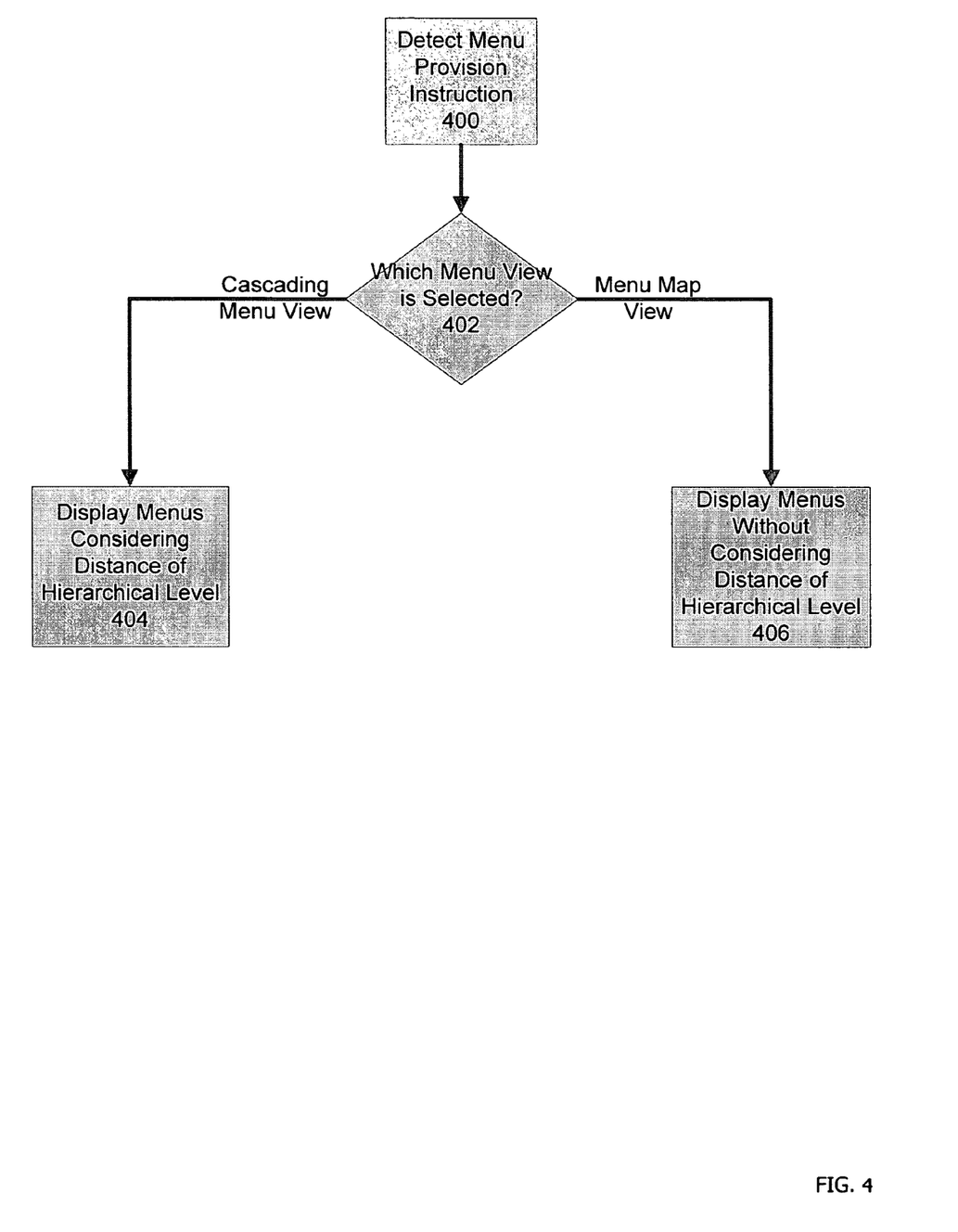
FIG. 4 is a flowchart that illustrates an example procedure that may be performed according to an example embodiment of the present invention.

FIG. 4 is a flowchart that shows an exemplary sequence of a procedure that may be executed according to an embodiment of the present invention. At 400, the system may detect a menu provision instruction. At 402, the system may determine which menu view is selected. If the cascading menu view is selected, then, at 404, the system may selectively display menus in cascading menu form in accordance with the distance of the menus' hierarchical menu levels from that of the selected menu item. At 404, the system may display (a) menus that include menu listings that are of menus including parent menu listings of a menu listing selected at 400, (b) a menu that includes the menu listing selected at 400, and/or (c) a menu that is of a hierarchical level immediately below that of the menu item selected at 400 and that is a child menu of the menu item selected at 400, and may omit from display all other menus. If the menu map view is selected, then, at 406, the system may display menus without consideration of the distance of their hierarchical levels from that of the selected menu item. For example, at 406, the system may display all menus displayed at 404, and may additionally display all child menus of the menu item selected at 400, regardless of the number of hierarchical levels by which the menus are removed from the menu item selected at 400. As discussed above, in some embodiments of the present invention, other menus may additionally be displayed at 406. For example, all menus of the menu category to which the selected menu item belongs may be displayed.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented menu display method, comprising:
   in response to a click of a menu item clickable via a first click event and via a second click event:
      determining, by a processor, by which of the first click event and the second click event the menu item was clicked, whichever one of the first click event and the second click event occurred thereby being a determined click event; and
      selectively associating, by the processor, the click with the menu item that has been clicked to render the menu item a selected menu item; and
   in accordance with the association of the click with the menu item and in accordance with the determination, displaying a menu by the processor and in a display device;
   wherein:
      the display of the menu is (a) in a menu map view where the determined click event is the first click event and (b) in a cascading view where the determined click event is the second click event; and
      the first click event is one of a right-click of a mouse and a left-click of the mouse, and the second click event is the other of the right-click of the mouse and the left-click of the mouse.

2. The method of claim 1, wherein, if the first click event has occurred, all submenus of the menu item are displayed in response to the click irrespective of the submenus' hierarchical levels.

3. The method of claim 2, wherein, if the first click event has occurred, all menus of a menu category to which the menu item belongs are displayed in response to the click.

4. The method of claim 3, wherein, if both the first click event has occurred and another menu category is selected subsequent to the menu display, menus of the other category are displayed instead of the menus of the menu category to which the menu item belongs.

5. The method of claim 1, wherein the determination is made in response to a click via the first or second click event conditional upon that the menu item is not selected from a display generated in response to a previous occurrence of the first click event.

6. The method of claim 5, wherein, if a menu listing is selected from the display generated in response to the previous occurrence of the first click event, the display generated in response to the previous occurrence of the first click event is modified to remove all menus from the display generated in response to the previous occurrence of the first click event, other than (a) a submenu of the menu listing, (b) a menu that includes the menu listing, and (c) a menu that includes a menu item that is a parent of the selected menu item.

7. The method of claim 1, wherein, if the first click event has occurred, a submenu displayed in response to the menu item click is displayed immediately following its parent menu item of an immediately preceding hierarchical level, and wherein another menu item of a menu that includes the parent menu item is displayed following the submenu.

8. The method of claim 1, further comprising:
generating a new window for the menu display upon the condition that the first click event has occurred, wherein the menu is otherwise displayed in a window in which the menu item is displayed.

9. The method of claim 8, wherein the new window remains open until one of selection of a window exit button and a window escape key.

10. The method of claim 1, wherein, if the second click event has occurred, a menu is displayed in response to the click upon a condition that the menu is one of (a) a menu that includes a menu item that is a parent of the selected menu item, (b) a menu that includes the selected menu item, and (c) a submenu of the selected menu item and of a hierarchical level that immediately follows the hierarchical level of the selected menu item.

11. The method of claim 1, wherein the menu item includes one of a menu category, a menu listing, a portion of a menu bar not assigned to any menu category, and an icon corresponding to a combination of all menu categories of the menu bar, and wherein, if the first click event occurs and the click is of one of the portion of the menu bar and the icon, all menus of all menu categories of the menu bar are displayed in response to the click.

12. The method of claim 1, further comprising:
responsive to a click of a menu listing from a display generated in response to an occurrence of the first click event and regardless of whether the click of the menu listing is via the first click event or the second click event, removing all menus from the generated display other than (a) a submenu of the menu listing, (b) a menu that includes the menu listing, and (c) a menu that includes a menu item that is a parent of the selected menu item.

13. The method of claim 1, further comprising:
responsive to click via the first click event of either of (a) a portion of a menu bar not assigned to any menu category and (b) an icon corresponding to a combination of all menu categories of the menu bar, displaying all menus of all menu categories of the menu bar; and
responsive to click via the first click event of either of (c) a menu category and (d) a menu listing of the menu category, displaying, of all of the menus, only a subset that correspond to the menu category.

14. A hardware computer-readable medium having stored thereon instructions adapted to be executed by a processor, the instructions which, when executed, cause the processor to perform a menu display method, the method comprising:
in response to a click of a menu item clickable via a first click event and via a second click event, wherein the first click event is one of a right-click of a mouse and a left-click of the mouse, and the second click event is the other of the right-click of the mouse and the left-click of the mouse:
determining via which of the first click event and the second click event the menu item was clicked, whichever one of the first click event and the second click event occurred thereby being a determined click event; and
selectively associating the click with the menu item that has been clicked to render the menu item a selected menu item; and
in accordance with the association of the click with the menu item and in accordance with the determination, displaying a menu, wherein the display of the menu is (a) in a menu map view where the determined click event is the first click event and (b) in a cascading view where the determined click event is the second click event.

15. A system for implementing a menu display method, comprising:
a computer processor configured to:
in response to a click of a menu item clickable via a first click event and via a second click event:
determine by which of the first click event and the second click event the menu item was clicked, whichever one of the first click event and the second click event occurred thereby being a determined click event; and
selectively associate the click with the menu item that has been clicked to render the menu item a selected menu item; and
in accordance with the association of the click with the menu item and in accordance with the determination, display a menu in a display device;
wherein:
the display of the menu is (a) in a menu map view where the determined click event is the first click event and (b) in a cascading view where the determined click event is the second click event; and
the first click event is one of a right-click of a mouse and a left-click of the mouse, and the second click event is the other of the right-click of the mouse and the left-click of the mouse.

16. A computer-implemented menu display method, comprising:
in response to a selection of a menu item selectable via a first selection event and via a second selection event:
determining, by a processor, by which of the first selection event and the second selection event the menu item was selected, whichever one of the first selection event and the second selection event occurred thereby being a determined selection event; and
displaying a menu by the processor and in a display device;
wherein:
the display of the menu is (a) in a menu map view where the determined selection event is the first selection event and (b) in a cascading view where the determined selection event is the second selection event; and
if the first selection event has occurred:
all submenus of the selected menu item are displayed in response to the selection irrespective of the submenus' hierarchical levels; and
a menu, that is not a submenu of the selected menu item and that includes menu items other than the selected menu item that are of the same or a higher hierarchical level as that of the selected menu item, is displayed, the display of said menu that is not a submenu of the menu item being conditional upon that said menu that is not a submenu of the menu item one of (a) includes the selected menu item, and (b) includes a menu item that is a parent of the selected menu item.

17. The method of claim 16, wherein the first selection event occurs via one of a right-click and a left-click of a mouse and the second selection event occurs via the other of the right-click and the left-click of the mouse.

18. A hardware computer-readable medium having stored thereon instructions adapted to be executed by a processor, the instructions which, when executed, cause the processor to perform a menu display method, the method comprising:
in response to a selection of a menu item selectable via a first selection event and via a second selection event:
determining by which of the first selection event and the second selection event the menu item was selected, whichever one of the first selection event and the second selection event occurred thereby being a determined selection event; and
displaying a menu in a display device;
wherein:
the display of the menu is (a) in a menu map view where the determined selection event is the first selection event and (b) in a cascading view where the determined selection event is the second selection event; and
if the first selection event has occurred:
all submenus of the selected menu item are displayed in response to the selection irrespective of the submenus' hierarchical levels; and
a menu, that is not a submenu of the selected menu item and that includes menu items other than the selected menu item that are of the same or a higher hierarchical level as that of the selected menu item, is displayed, the display of said menu that is not a submenu of the menu item being conditional upon that said menu that is not a submenu of the menu item one of (a) includes the selected menu item, and (b) includes a menu item that is a parent of the selected menu item.

19. A system for implementing a menu display method, comprising:
a computer processor configured to, in response to a selection of a menu item selectable via a first selection event and via a second selection event:
determine by which of the first selection event and the second selection event the menu item was selected, whichever one of the first selection event and the second selection event occurred thereby being a determined selection event; and
display a menu in a display device;
wherein:
the display of the menu is (a) in a menu map view where the determined selection event is the first selection event and (b) in a cascading view where the determined selection event is the second selection event; and
if the first selection event has occurred:
all submenus of the selected menu item are displayed in response to the selection irrespective of the submenus' hierarchical levels; and
a menu, that is not a submenu of the selected menu item and that includes menu items other than the selected menu item that are of the same or a higher hierarchical level as that of the selected menu item, is displayed, the display of said menu that is not a submenu of the menu item being conditional upon that said menu that is not a submenu of the menu item one of (a) includes the selected menu item, and (b) includes a menu item that is a parent of the selected menu item.

20. A computer-implemented menu display method, comprising:
in response to a click of a menu item clickable via a first click input and via a second click input, selectively associating, by the processor, the click with the menu item that has been clicked to render the menu item a selected menu item; and
in accordance with the association of the click with the menu item:
if the click is via the first click input:
determining, by the processor, a distance between a hierarchical level of a menu and a hierarchical level of the menu item;
based on the distance determination, determining, by the processor, whether to display the menu; and
if it is determined that the menu is to be displayed, displaying the menu, by the processor and in a display device; and
if the click is via the second click input, displaying the menu, by the processor and in the display device, in accordance with the association and without consideration of the distance between the hierarchical level of the menu and the hierarchical level of the menu item;
wherein the first click input is one of a right-click of a mouse and a left-click of the mouse, and the second click input is the other of the right-click of the mouse and the left-click of the mouse.

21. The method of claim 20, wherein:
the menu item has a plurality of submenus of different hierarchical levels;
if the click of the menu item is via the first click input, of the plurality of submenus, only a submenu that is of a hierarchical level immediately below a hierarchical level of the menu item is displayed; and
if the click of the menu item is via the second click input, all of the plurality of submenus are displayed.

22. The method of claim 21, wherein:
the submenu displayed if the click of the menu item is via the first click input is subsequently removed from display in response to a movement of a pointer away from all of the following: (a) all displayed submenus of the menu item and (b) the menu item; and
the submenus displayed if the click of the menu item is via the second click input are not removed from display in response to the movement of the pointer away from (a) and (b).

23. A hardware computer-readable medium having stored thereon instructions adapted to be executed by a processor, the instructions which, when executed, cause the processor to perform a menu display method, the method comprising:
in response to a click of a menu item clickable via a first click input and via a second click input, selectively associating the click with the menu item that has been clicked to render the menu item a selected menu item; and
in accordance with the association of the click with the menu item:
if the click is via the first click input:
determining a distance between a hierarchical level of a menu and a hierarchical level of the menu item;
based on the distance determination, determining whether to display the menu; and
if it is determined that the menu is to be displayed, displaying the menu in a display device; and if the click is via the second click input, displaying the menu in the display device in accordance with the association and without consideration of the distance between the hierarchical level of the menu and the hierarchical level of the menu item;

wherein the first click input is one of a right-click of a mouse and a left-click of the mouse, and the second click input is the other of the right-click of the mouse and the left-click of the mouse.

24. A system for implementing a menu display method, comprising:

a computer processor configured to:

in response to a click of a menu item clickable via a first click input and via a second click input, selectively associate the click with the menu item that has been clicked to render the menu item a selected menu item; and in accordance with the association of the click with the menu item:

if the click is via the first click input:

determine a distance between a hierarchical level of a menu and a hierarchical level of the menu item;

based on the distance determination, determine whether to display the menu; and if it is determined that the menu is to be displayed, display the menu in a display device; and if the click is via the second click input, display the menu in the display device, in accordance with the association and without consideration of the distance between the hierarchical level of the menu and the hierarchical level of the menu item;

wherein the first click input is one of a right-click of a mouse and a left-click of the mouse, and the second click input is the other of the right-click of the mouse and the left-click of the mouse.

\* \* \* \* \*